United States Patent [19]
Offermann

[11] 3,983,360
[45] Sept. 28, 1976

[54] MEANS FOR SECTIONALLY INCREASING THE HEAT OUTPUT IN A HEAT-GENERATING PIPE

[75] Inventor: Paul F. Offermann, Redwood City, Calif.

[73] Assignee: Chevron Research Company, San Francisco, Calif.

[22] Filed: Nov. 27, 1974

[21] Appl. No.: 527,796

[52] U.S. Cl. .............................. 219/301; 137/341; 138/33; 219/10.51; 219/300
[51] Int. Cl.² ...................... H05B 3/00; H05B 5/00; F16L 53/00
[58] Field of Search ................ 219/300, 301, 10.49, 219/10.47, 10.51; 222/146 HE; 137/341; 138/33

[56] References Cited
UNITED STATES PATENTS

| | | | |
|---|---|---|---|
| 3,515,837 | 6/1970 | Ando | 219/10.49 |
| 3,523,177 | 8/1970 | Ando | 219/300 |
| 3,598,959 | 8/1971 | Ando | 219/300 |
| 3,629,551 | 12/1971 | Ando | 219/300 |
| 3,632,975 | 1/1972 | Ando et al. | 219/301 |
| 3,632,976 | 1/1972 | Ando | 219/10.51 X |
| 3,665,154 | 5/1972 | Ando | 219/301 |
| 3,755,650 | 8/1973 | Ando | 219/301 |

*Primary Examiner*—A. Bartis
*Attorney, Agent, or Firm*—R. L. Freeland, Jr.; R. T. Kloeppel

[57] ABSTRACT

A heat-generating pipe is made up of a ferromagnetic pipe having an electrically insulated wire extending through the pipe to a given point so that the pipe and first wire may be electrically connected in series with an alternating current supply to generate heat in the pipe. A second electrically insulated wire is provided parallel to the first wire in that portion of the pipe wherein increased heat output is desired. The second wire is connected to the alternating current supply and the first and second insulated wires are simultaneously energized. The power supply may comprise separate alternating current sources for energizing each of the first and second wires. Alternatively the second wire can be energized from the secondary of a transformer having its primary in series with the first wire. The first and second insulated wires can comprise a single wire looped back along the heat-increase section to provide two series connected wire segments.

9 Claims, 4 Drawing Figures

MEANS FOR SECTIONALLY INCREASING THE HEAT OUTPUT IN A HEAT-GENERATING PIPE

BACKGROUND OF THE INVENTION

1. Field of the Invention

This invention relates to a system for increasing heat output in a specific section of a pipeline using an internal wire impedance system.

2. DESCRIPTION OF THE PRIOR ART

Pipelines often require the fluid flowing in them to have lower viscosities than they would have at the ambient temperature of the pipe. In order to reduce the viscosity of the fluid, heat is generally transferred into the fluid. A way to achieve this is through steam tracing, that is, a system which uses steam flowing in a separate conduit adjacent to the one transporting the fluid. Another system is one using alternating current and the effects of a magnetic field produced by the current to increase the temperature of the fluid in the flow pipe. This second method has in the past been called "skin effect heating," or more correctly, "internal wire impedance heating."

Industry has used the skin effect or internal wire impedance heating which, under current practice, uses a ferromagnetic pipe attached substantially parallel and either interior or exterior to a fluid-flow pipe. The ferromagnetic pipe has longitudinally extending through it an insulated copper wire that is electrically connected to the ferromagnetic pipe at a point remote from the point of entry of the insulated wire. This allows both the wire and pipe to be connected in series with each other and a source of alternating current power. Thus, the electric current flows through the insulated wire and returns through the wall of the ferromagnetic pipe. Due to the skin effect, most of the current flows near the inside wall of the pipe.

Heat is generated in the wall of the ferromagnetic pipe by magnetic hysteresis resulting from a type of internal friction as the magnetic domains within the pipe wall are reversed; eddy currents in the pipe wall due to the presence of the pipe wall in a changing magnetic field which induces currents to circulate throughout the pipe wall yielding an $I^2R$ heating effect; and the $I^2R$ effect of the current returning through the pipe wall. Additional heat is also generated in the insulated wire according to Joule's Law, i.e., the $I^2R$ effect of the current flowing in it.

A point worth mentioning here is the reason for using a pipe having the property called "ferromagnetism." It simply is that this property greatly increases the magnetic field in the pipe wall due to the alternating current through the conductor, which results in significant heating by hysteresis and eddy currents. Examples of ferromagnetic elements are iron, nickel and cobalt. Additionally, a few alloys may have components which by themselves are not ferromagnetic, but when combined as an ally exhibit this property, e.g., MnBi.

In prior installations of internal wire impedance heating systems of which I am aware, a standard way to further increase the heat output of a given section of pipe for any length of time does not exist. The present invention, however, includes several embodiments which do increase the heat output for a given section without affecting the heat output of any adjacent section. The utilization of the present invention results in both an economical and efficient use of electrical power.

An example where economy and efficiency result is when a portion of buried heated pipeline is located above ground, and the ambient temperature is very low. The portion above ground will have a greater heat loss, and will consequently require more heat. Similarly, it is desirable to have a heat increase through a section that has less effective insulation or the pipe has a section of increased diameter.

Additional uses and advantages of this invention will become evident from the summary of invention, the drawings and the description of the preferred embodiment.

SUMMARY OF THE INVENTION

The invention utilizes an electromagnetic field-increasing means electrically connected in series with an internal wire impedance system to achieve an increase in the heat output throughout a given section of pipe. An insulated electrical conductor or wire which extends longitudinally through a ferromagnetic pipe is connected in series with the pipe and a source of alternating current.

The electromagnetic field-increasing means installed in this series circuit may take several different forms. One is a combination of a second source of alternating current in series with a second insulated wire. The second wire extends within the pipe parallel both to a first wire extending throughout the entire pipe and to the section where an increased heat output is sought and is electrically connected to the farthest end of this section so that it is electrically in series with it and the second source of power. Alternatively, this wire could pass through the pipe and be electrically connected in series with the power source.

An alternative embodiment, further described below, has the insulated wire connected at one end of a power source. The wire extends to the far end of the section wherein an increased heat output is desired. At this point the insulated wire passes through the wall of the pipe and extends exteriorly along the outside of the pipe to the beginning of the section where an increased heat output is desired. The insulated wire then returns inside the pipe and extends to the far end and is electrically connected in series with the pipe.

The invention may also take the form of a supplemental alternating current source consisting of a transformer with a primary and secondary winding located exterior to the pipeline. A first insulated wire is connected electrically in series with one terminal of the primary and the power source; a second terminal of the primary is connected in series with a second insulated wire that extends inside the pipe and is connected to the farthest end of the heated pipe. In like manner, the secondary winding is connected electrically in series with a third insulated wire, but this wire extends and is connected to the end point where the additional heat output is desired.

The present invention also includes a procedure for increasing the heat output of a section of a heat-generating pipe that is located internally or externally to a pipeline.

In summary, the steps include electrically connecting an insulated wire to a first terminal of a power source of alternating current; extending the insulated wire through the wall of a ferromagnetic pipe and directly connecting it to a point in the pipe where a heat output is desired. The second terminal of the power source is then connected to the pipe to make a complete electrical series circuit. Next, an electromagnetic field-increasing means for increasing the alternating magnetic field and heat output in a given section is electrically connected in a series circuit.

Specifically, the last aforementioned step may include electrically connecting a second source of alternating current into an electrical series circuit to a second insulated wire which extends longitudinally only through the section where an increased heat output is desired. Alternatively, a transformer which has a secondary and primary winding may be used. The primary winding is electrically connected in series with a first insulated wire which is extended past the section where an increased heat output is desired to the end of the heat generating pipe. The secondary winding is, then, electrically connected in series with another insulated wire. This wire is extended only along the section where an increased heat output is desired where it is connected in series with the secondary. This alternative provides another path of alternating current physically parallel to a first insulated wire. Since the current flowing through the two insulated wires is in the same direction, the alternating magnetic fields are additive, resulting increases in heat output.

Moreover, the method may take the steps of passing the insulator wire through the wall of the pipe at the end of the section where an increased heat output is desired and then back along the exterior of the pipe to the beginning of the increased heat output section. At this point, the wire is passed through the wall of the pipe along the interior of the pipe to the point which is to be generally heated up. As pointed out above, the current flows through the separate wires in the same direction, allowing their alternating magnetic fields to be additive.

BRIEF DESCRIPTION OF THE DRAWINGS

The above-described embodiments and advantages will be further illustrated and described in the drawings and the following description of the preferred embodiment.

DESCRIPTION OF THE PREFERRED EMBODIMENT

Figure 1:
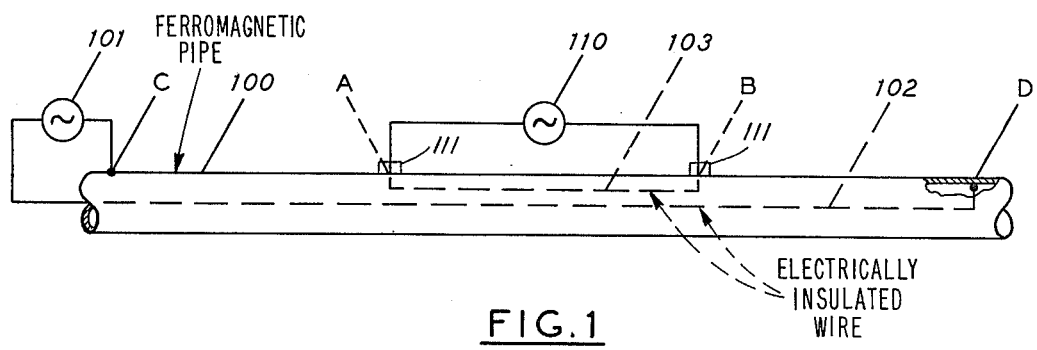
FIG. 1 illustrates schematically a first embodiment of the present invention applied to a pipeline section heated by an internal wire impedance system including at least one insulated wire connected to a power source. In this embodiment, a second insulated wire means is physically parallel to the increased-heat-output section and in series with a second source of alternating current.

Referring now to FIG. 1, the ferromagnetic pipe 100 has a section where an increased heat output is sought, designated by point A and point B. Throughout the following discussion, point A is considered the beginning of the section of increased heat output and point B is the end of the section.

A power source of alternating current 101 is electrically connected to a point C that is adjacent to the entering point of an insulated wire means 102. This wire means terminates at remote point D where it is directly connected to pipe 100 so the current flows through the ferromagnetic pipe. Internal to pipe 100 is an electromagnetic field-increasing means for additionally increasing the heat output in a given section of pipe 100. Such means may be an insulated wire means 103 electrically connected in series with a second source of alternating current 110. The wire means 103 is extended in the interior of pipe 100 between points A and B, FIG. 1. The object of increasing the heat output in this embodiment may also be accomplished where wire means 103, as in FIG. 2, is connected in series with pipe 100 at the end of the section to be heated (point B) and the second alternating current source 110 (adjacent to point A).

Figure 2:
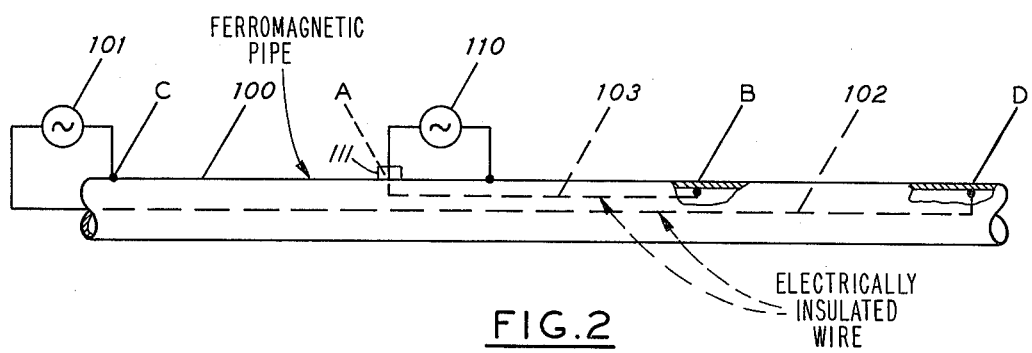
FIG. 2 is a schematic illustration of another embodiment of the present invention similar to that illustrated in FIG. 1, but utilizing the pipe as the return path means.
Figure 3:
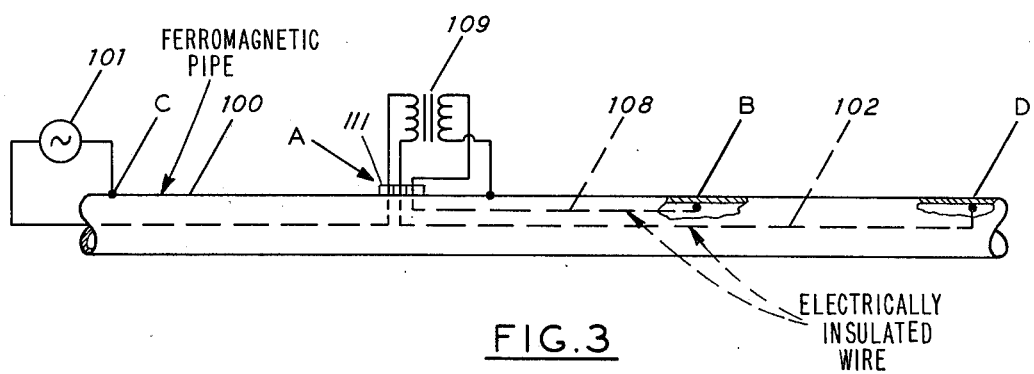
FIG. 3 illustrates schematically an embodiment which has a supplemental transformer having its primary winding in series with the first wire means connected to the main power supply and its secondary winding in series with a second wire means.
Figure 4:
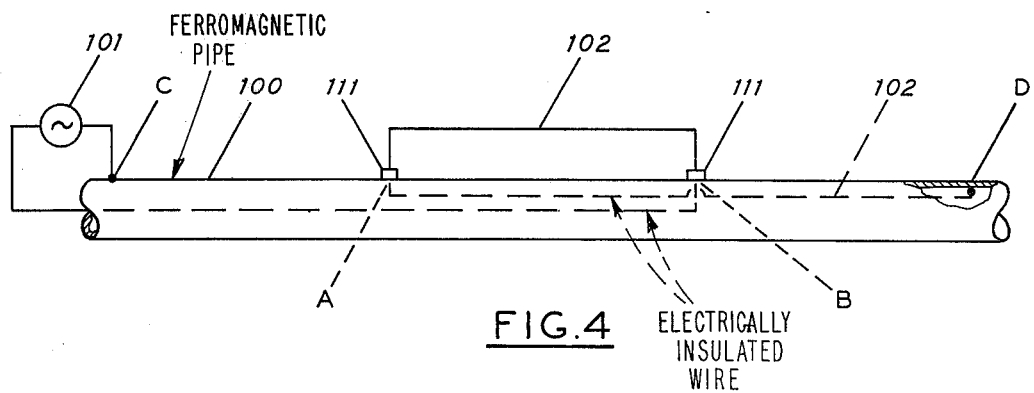
FIG. 4 is a schematic diagram of an embodiment of the present invention where the insulated wire means which extends longitudinally through the ferromagnetic pipe loops back along the exterior of the pipe and into the pipe to form two physically parallel wires in the section where an increased heat output is sought.

The embodiment in FIG. 1, as do the embodiments shown in FIGS. 2, 3 and 4, illustrates a first insulated wire which generates an electromagnetic field when alternating current flows through it between points C and D. This field is added to a second electromagnetic field caused by alternating current flowing through a second insulated wire located between points A and B with the consequence that the heat output between A and B is greater than the other adjoining sections of pipe. To accomplish this, power sources 101 and 110 in FIGS. 1 and 2 should be in phase with each other. In FIGS. 3 the current flow from 109 is substantially in phase with that in 101 of FIG. 3 so that the alternating magnetic fields, generated by each alternating current flow, are added.

An alternative embodiment of the present invention is diagrammatically illustrated in FIG. 3. In this embodiment, insulated wire means 102 is electrically connected in a series circuit comprising the power source 101, the primary winding of the transformer 109, and the pipe 100. In order to increase the heat output in section A-B, one terminal of the secondary winding of transformer 109 is connected to a second insulated wire means 108 extending longitudinally through the pipe 100 along pipe section A-B and connected to the pipe at point B. The other secondary terminal is either connected directly to the pipe adjacent to point A or the other end of wire means 108 which passes through the pipe at point B.

Another embodiment of the present invention is shown in FIg. 4, where the insulated wire means 102 within the pipe 100 passes through the pipe at point B and loops back to point A, passing again to the inside of the pipe 100. From here the wire means continues within pipe 100 along section A-B to the end of pipe 100. This arrangement allows the creation of two magnetic fields, which are additive, thus increasing heat output.

In the embodiments described above, the continuous insulated wire means may be instead separate insulated wire means which are in series with each other. This arrangement would facilitate installation of the invention, particularly on existing pipelines.

In situations where the pipe 100 is also the conduit for fluid flow, the passage of the conductor means through the pipe wall may be made fluid-impervious by using appropriate fittings 111, FIGS. 1 to 4 so that the contents of the pipe 100 will not leak at these places. Thus, the means for passing the conductor through the pipe may be a grommetted penetration, a screwable or weldable fitting or other leak-proof means. Further this fitting may electrically insulate a wire from the ferromagnetic pipe such as wire 103 in FIGS. 1 and 2, wires 102 and 108 in FIG. 3 and wire 102 in FIG. 4 provided the fitting is made from electrically insulative material. However, the insulation on these wires is ordinarily sufficient for this purpose.

Although only selected embodiments of the present invention have been described in detail, the invention is not to be limited to any specific embodiments, but rather only by the scope of the appended claims.

What is claimed as:

1. In combination with a heat-generating pipe of the type wherein a ferromagnetic pipe has extending longitudinally through a predetermined length of said pipe a first insulated wire portion connected in series with an alternating current supply means and said predetermined length of ferromagnetic pipe and a return path means through said pipe to said alternating current supply means, the improvement comprising:
   a second insulated wire portion parallel to said first insulated wire portion and extending within a selected portion of said predetermined length of ferromagnetic pipe a distance less than the length of said predetermined length; and means for connecting said second insulated wire portion to said alternating current supply means so that the magnetic field resulting from the current flow from said supply means in said second insulated wire is additive to the magnetic field resulting from the alternating current flow in said first insulated wire from said supply means whereby the heat output within said selected portion through which said second insulated wire is located is additionally increased.

2. The improvement of the heat-generating pipe of claim 1 wherein said alternating current supply means comprises first and second alternating current sources, said first source being connected in series with said first wire portion and said pipe;
   and wherein said connecting means connects electrically said second insulated wire portion in series with said second source of alternating current and the selected portion of said pipe, said second wire portion longitudinally extending in said pipe along the selected portion of said ferromagnetic pipe where said additional increase in heat output is desired so that two physically parallel paths of alternating current are provided through the selected length where said additional increase in heat output is desired whereby the heating effects of two electromagnetic fields produced by said parallel paths are additive.

3. The improvement of the heat-generating pipe of claim 1 wherein said alternating current supply means comprises first and second alternating current sources, said first source being connected in series with the first wire portion and said pipe; and
   wherein said connecting means electrically connects said second wire portion to one terminal of said second source of alternating current; and further comprises
   a means for passing said second wire portion through the wall of said pipe so that said second insulated wire portion extends longitudinally in said selected portion of ferromagnetic pipe wherein an additional increase in heat output is desired;
   means for passing said second wire portion through said pipe at the end of said selected portion of ferromagnetic pipe wherein said additional increase in heat output is desired and wherein said connecting means further comprises:
   a third wire portion connected in series with said second wire portion and connected to another terminal of said second source of alternating current whereby an alternating current flows from said second source through said second insulated wire portion resulting in a second alternating magnetic field which adds to a first alternating magnetic field resulting from the current flowing through said first insulated wire portion.

4. The improvement of the heating generating pipe of claim 1 wherein said alternating current supply means includes:
   a source of alternating current;
   means for connecting one terminal of the source to the pipe to form the return path; and
   a transformer having at least a secondary and primary winding, each of said windings having at least two terminals;
   said first insulated wire portion comprising first and second segments, one end of said first segment of said first insulated wire portion electrically connected to the other terminal of said current source and extending longitudinally through said pipe to the beginning of said selected portion of ferromagnetic pipe where an additional increase in heat output is sought;
   means for connecting the other end of said first segment of said first wire portion to the first terminal of said primary winding;
   said second segment of said first insulated wire portion extending through said pipe having one end connected to the end of said predetermined length of pipe;
   means for connecting the other end of said second segment of said first wire portion to the second terminal of said primary winding;
   and wherein said means for connecting said second insulated wire portion includes means for electrically connecting said second insulated wire portion to a terminal of said secondary winding;
   said second wire portion passing through the wall of said pipe at the beginning of said selected portion of said ferromagnetic pipe, and
   said second wire portion extending longitudinally through said pipe up to the end of said selected portion where an additional increase in heat output is desired,
   said second wire portion electrically connected to the end of said selected portion and electrically in series with the other terminal of said secondary winding by another part of said means for connecting said second insulated wire portion whereby alternating magnetic fields produced by said first and second insulated wire portions are additive.

5. The improvement of the heat-generating pipe of claim 1 further comprising:

means for passing said first insulated wire portion through the wall of said pipe at the end of said selected portion of ferromagnetic pipe wherein an additional increase in heat output is sought;

said second insulated wire portion extending longitudinally back along the exterior of said pipe;

said means for connecting connects said second wire portion electrically in series with said first wire portion;

means for passing said second wire portion through said pipe at the beginning of said selected portion of ferromagnetic pipe;

a third wire portion connected to the end of said second portion and extending within and longitudinally along the pipe to the end of said predetermined length, said third wire portion connected to the end of said predetermined length and electrically in series with said alternating current supply means;

whereby two physically parallel paths of alternating current are formed that result in two additive magnetic fields with corresponding additional heat increase throughout said selected portion of said ferromagnetic pipe.

6. A method for additionally increasing the heat output of a section between two longitudinally spaced points of a heat-generating pipe that is to be heated by an alternating magnetic field, comprising the steps of:

electrically connecting a first insulated wire portion to a first terminal of an alternating-current supply means;

extending said first insulated wire portion through a ferromagnetic pipe up to an extreme point where heat is desired;

electrically connecting said wire to said pipe at said extreme point;

electrically connecting another point of said pipe, which is a preselected distance from said extreme point, to a second terminal of said alternating current supply means to make a complete series electrical circuit through said pipe; extending a second insulated wire portion through said ferromagnetic pipe between said longitudinally spaced points for additionally increasing the alternating magnetic field and heat output produced by the alternating current as said current flows through said first insulated wire portion in said pipe within the section between said two points of said pipe where additional heat output is desired;

energizing said second insulated wire portion from said alternating current supply means; and simultaneously energizing said first insulated wire portion from said alternating current supply means.

7. The method of claim 6 wherein said alternating current supply means includes a first and second source of alternating current and wherein said first wire portion being energized from said first alternating current source.

and wherein said step of extending said second wire portion further comprises connecting one terminal of said second source of alternating current to said second insulated wire portion;

passing said second insulated wire portion through the wall of said pipe at the first point of said two longitudinally spaced points;

extending said second insulated wire portion physically parallel to the section between said two points of said pipe where additional heat output is desired;

passing said second insulating wire portion through the wall of said pipe at the last point of said two longitudinally spaced points; and connecting said second insulated wire portion to a second terminal of said second source of alternating current so that the alternating current from said second source flows through said second insulated wire portion resulting in a second alternating magnetic field that adds to a first alternating magnetic field resulting from the flow of current in said first insulated wire portion from said first source of alternating current whereby the heating effects of the first and second magnetic fields are additive.

8. The method of claim 6 wherein the steps of connecting said first wire portion further comprises connecting a first segment of said first insulated wire portion to an alternating current source of said alternating current supply means connecting the other end of said first segment of said first wire portion to a first terminal of a primary winding of a transformer located adjacent to a beginning point of said two longitudinally spaced points between which additional heat output is desired, so that said alternating current source and the primary of said transformer are electrically in series with each other;

connecting a second segment of said first insulated wire portion to a second terminal of said primary winding of said transformer;

extending said second segment of said first insulated wire portion longitudinally within said pipe;

connecting said second segment of said first insulated wire portion to the extreme point on said pipe where heat is desired and connecting the other terminal of said alternating current source to the pipe to provide a return path and wherein the step of extending said second insulated wire portion comprises connecting said second insulated wire portion to a first terminal of said transformer at said first longitudinally spaced point where additional heat is desired;

extending said second insulated wire portion to the other point of said two longitudinally spaced points of said heat-generating pipe wherein an additional heat output is desired; and connecting said second insulated wire portion to the other terminal of said secondary winding, so that alternating magnetic field produced by said second segment of said first insulated wire portion and second insulated wire portion are additive.

9. The method of claim 6 wherein the step of extending said first insulated wire portion further comprises passing the first insulated wire portion through the wall of the pipe at the end point of said two longitudinally spaced points between which additional heat output is desired.

extending said first insulated wire portion along the exterior of said pipe to the beginning point of said two longitudinally spaced points between which additional heat output is desired;

passing said first insulated wire portion through the wall of said pipe at said beginning point so as to form said second insulated wire portion; and wherein the step of extending said second insulated wire portion further comprises longitudinally extending said second insulated wire portion in said pipe to said extreme point of said pipe; and connecting said first insulated wire portion and said second insulated wire portion in series with each other and with said alternating current supply means so that two alternating magnetic fields in the same direction result between said two longitudinally spaced points of increased heat output when the alternating current flows in said first and second insulated wire portions.

* * * * *

UNITED STATES PATENT OFFICE
CERTIFICATE OF CORRECTION

Patent No. 3,983,360  Dated September 28, 1976

Inventor(s) Paul F. Offermann

It is certified that error appears in the above-identified patent and that said Letters Patent are hereby corrected as shown below:

Col. 1, line 58, "ally" should read -- alloy --.

Col. 3, lines 25-26, "resulting increases" should read -- resulting in increases --.

Col. 8, line 14, after "means" insert -- ; --;

line 50, "desired." should read -- desired; --.

Signed and Sealed this

Tenth Day of May 1977

[SEAL]

Attest:

RUTH C. MASON
*Attesting Officer*

C. MARSHALL DANN
*Commissioner of Patents and Trademarks*